Figure 1:
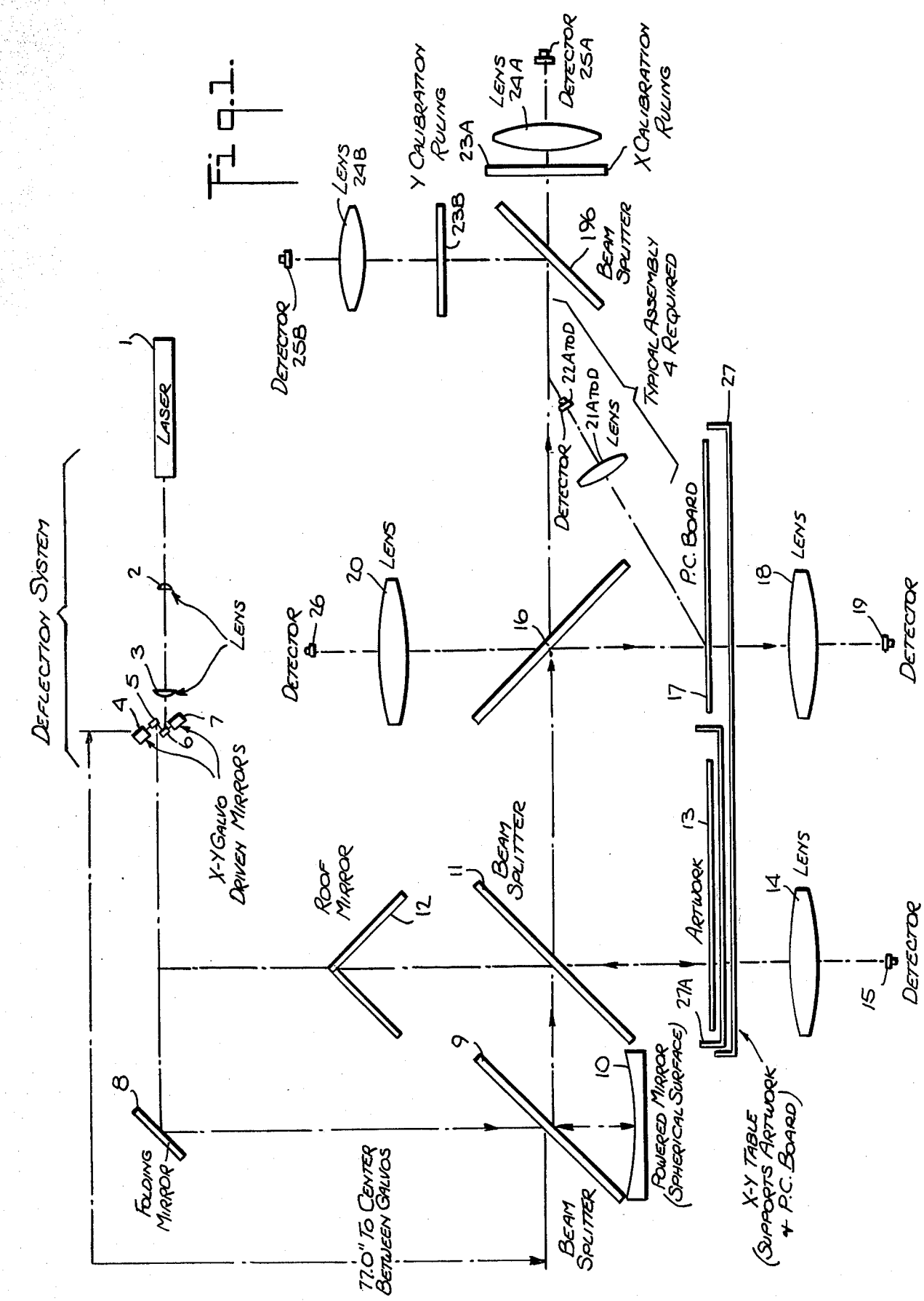

United States Patent [19]

Altman

[11] 4,269,515
[45] May 26, 1981

[54] ELECTRO-OPTICAL SYSTEM FOR INSPECTING PRINTED CIRCUIT BOARDS

[75] Inventor: Norman G. Altman, Stamford, Conn.

[73] Assignee: Altman Associates, Inc., Stamford, Conn.

[21] Appl. No.: 64,519

[22] Filed: Aug. 7, 1979

[51] Int. Cl.³ ............................................. G01B 11/00
[52] U.S. Cl. .................................... 356/394; 356/387
[58] Field of Search ........ 356/376, 378, 380, 384–387, 356/392–394, 390, 398, 237, 448, 73; 250/560, 563

[56] References Cited

U.S. PATENT DOCUMENTS

| | | | |
|---|---|---|---|
| 3,776,995 | 12/1973 | Little, Jr. ................................ | 350/6.2 |
| 4,170,401 | 10/1979 | Yoder et al. .......................... | 356/138 |

OTHER PUBLICATIONS

Goedertier, P. V. "Inspection System For LSI Structures", RCA Tech. Notes, TN. No. 1221, 12-29-78.
Krochmann et al., "Automatic Vector Distance Comparator VDK Projektina", Feinwerk Technik & Messtechnik, vol. 84, 10, 11-76, pp. 330-334.

*Primary Examiner*—Vincent P. McGraw
*Assistant Examiner*—Wm. H. Punter
*Attorney, Agent, or Firm*—Michael Ebert

[57] ABSTRACT

A system for inspecting a printed circuit board constituted by an insulating board having a conductive pattern thereon which creates interconnections between circuit elements mounted on the board. In this system, a laser beam is deflected in the X and Y directions to generate a raster scan which is optically split in a manner making it possible to simultaneously examine corresponding sections of the conductive pattern on the board and on the artwork from which the board is derived. The artwork possesses the same scale and the same orientation as the desired conductive pattern on the board and therefore represents the nominal pattern required therefor. In this simultaneous examination, a comparison is made in an associated computer between the dimensions of the conductors in the pattern and the spacings therebetween on the board and on the artwork to determine the extent of the disparities therebetween.

7 Claims, 4 Drawing Figures

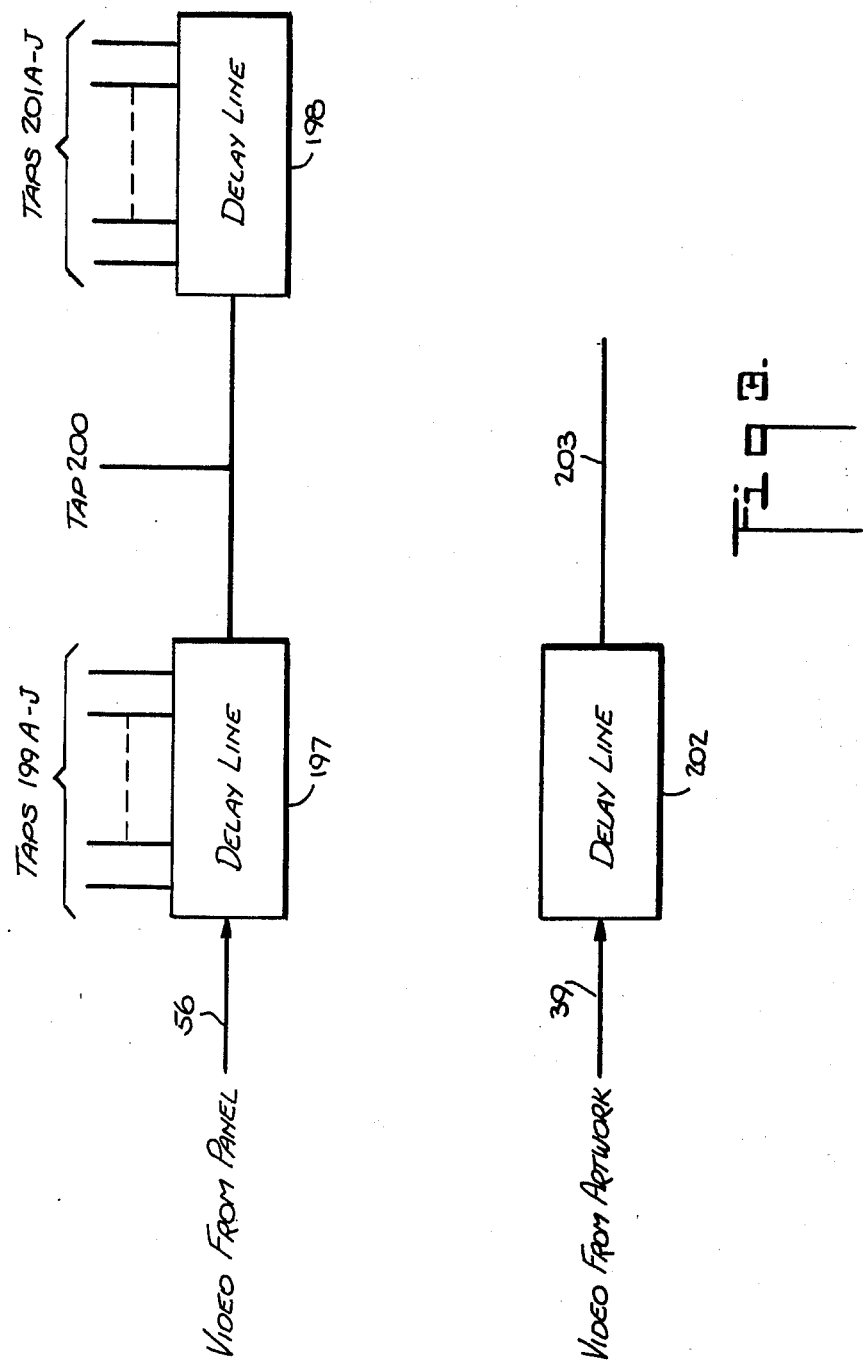

ELECTRO-OPTICAL SYSTEM FOR INSPECTING PRINTED CIRCUIT BOARDS

BACKGROUND OF INVENTION

This invention relates to a non-contacting electro-optical technique and a system based thereon for inspecting printed circuit boards.

The use of printed circuit boards for mounting and connecting electronic circuits and components is now commonplace in the electronics industry. The printed circuit board, however fabricated, consists fundamentally of an insulating or non-conducting medium normally in the form of a plastic sheet for supporting conductors which are dispersed on or through this medium to provide interconnections between the electronic components and circuits which are to be mounted on the board.

The usual practice is to provide a series of holes through the board for the electrical connections to the components or circuits which are to be supported thereon. These holes are electrically interconnected by the conducting paths so that the components and/or circuits mounted on the printed circuit board are properly interconnected electrically.

The most common procedure for manufacturing such printed circuit boards results in the conductive material being formed on one or both surfaces of the insulating sheet, the material being generally in a color which is highly contrasting to that of the sheet upon whose surface it is mounted.

In many cases, several such sheets of insulating material with conductors formed on their surfaces are laminated together to create the final circuit board. However, in the manufacturing procedure there is always some stage at which the individual layers or sheets are available for inspection before they are bonded to additional layers to form the final printed circuit board package.

There are currently two procedures in widespread use to carry out inspection of printed circuit boards. One is simple and direct visual inspection of each of the conductive patterns which is visible on its insulating substrate. The second method makes use of a set of contacts known in the trade as "a bed of nails," these contacts being deployed to engage test points or holes on the board being inspected. These contacts in the set are connected to a suitably programmed computer to insure that those accessible test points or holes in the printed circuit board which should be interconnected are actually interconnected, and those which should be isolated are in fact isolated.

Existing inspection procedures have certain disadvantages. To begin with, visual inspection is time-consuming and quite expensive. Moreover, it depends upon visual acuity and alertness on the part of an operator. Visual inspection becomes more difficult to carry out with the increasing density and complexity of the conductive pattern on the printed circuit board. And since the development of printed circuits is now in the direction of conductor line widths and line spacing appreciably below 0.010", and is rapidly approaching 0.005" and even smaller, visual inspection at this level is difficult if not impossible to perform in a viable manner.

The "bed of nails" approach suffers from two major drawbacks; the first being the high cost of the fixturing which has to be specially configured to each board. The second is that it is strictly a GO-NO/GO test and affords no indication of the quality of the interconnections between the points being tested.

In particular, the "bed of nails" test cannot determine, in commercial configurations available today, whether the interconnections are made by conductors of proper width, or whether the interconnections are effected by marginally narrow conductor lines. Similarly, one cannot determine whether the spacing between conductive paths is minimal with a high probability of undesirable leakage between these conductors and the subsequent development under field conditions of an actual short, or whether the spacing is at the value assigned by the design engineer for the requisite reliability of the system for which the printed circuit board is intended.

SUMMARY OF INVENTION

In view of the foregoing, the main object of this invention is to provide an electro-optical non-contact technique and a system based thereon for examining the conductive pattern visible on a printed circuit board or an individual layer thereof in order to determine whether the interconnections comply with specified conductor widths and conductor spacings.

A significant feature of the invention is that it is also capable of determining many other important aspects of the printed circuit board which bear on its quality and reliability.

More particularly, it is the object of this invention to ascertain the position of all holes and other cutouts in the printed circuit board, and to determine their dimensions in terms of absolute coordinates as well as in relation to the conductive pattern in which they are used.

This part of the pattern surrounding the component mounting hole is commonly referred to as the "pad" and must be so located that the hole associated with it is properly centered. Though some de-centration is normally allowed, the tolerances are determined by the reliability requirements of the final configuration, and therefore the magnitude and direction of the de-centration must be measured for each hole and its associated pad in order to assure that the specified reliability requirements are met.

Briefly stated, in a system in accordance with the invention for inspecting a printed circuit board constituted by an insulating board having a conductive pattern thereon, a laser beam is deflected in the X and Y directions to generate a raster scan. The scan is optically split to simultaneously examine corresponding sections of the conductive pattern on the board and in the transparent artwork from which the board is derived. The artwork possesses the same scale and orientation as the desired conductive pattern on the board and therefore represents the nominal pattern required therefor.

By detecting the light transmitted through the artwork and the light reflected from the board in the course of the simultaneous scan thereof and analyzing the resultant signals in an associated computer, a comparison can be made between the dimensions of the conductors in the pattern and the spacings therebetween on the board and on the artwork, thereby making it possible to determine the extent of deviations between the nominal pattern and the actual pattern.

The board has holes therein for effecting electrical connections to the circuit elements which are to be supported thereon. During the simultaneous scanning of the artwork and on the board, by detecting the light passing through the holes, the positions of the holes on the board are established and their dimensions and coordinates are compared to nominal values stored in the computer to determine their degree of deviation from these nominal values.

OUTLINE OF DRAWINGS

Figure 2A:
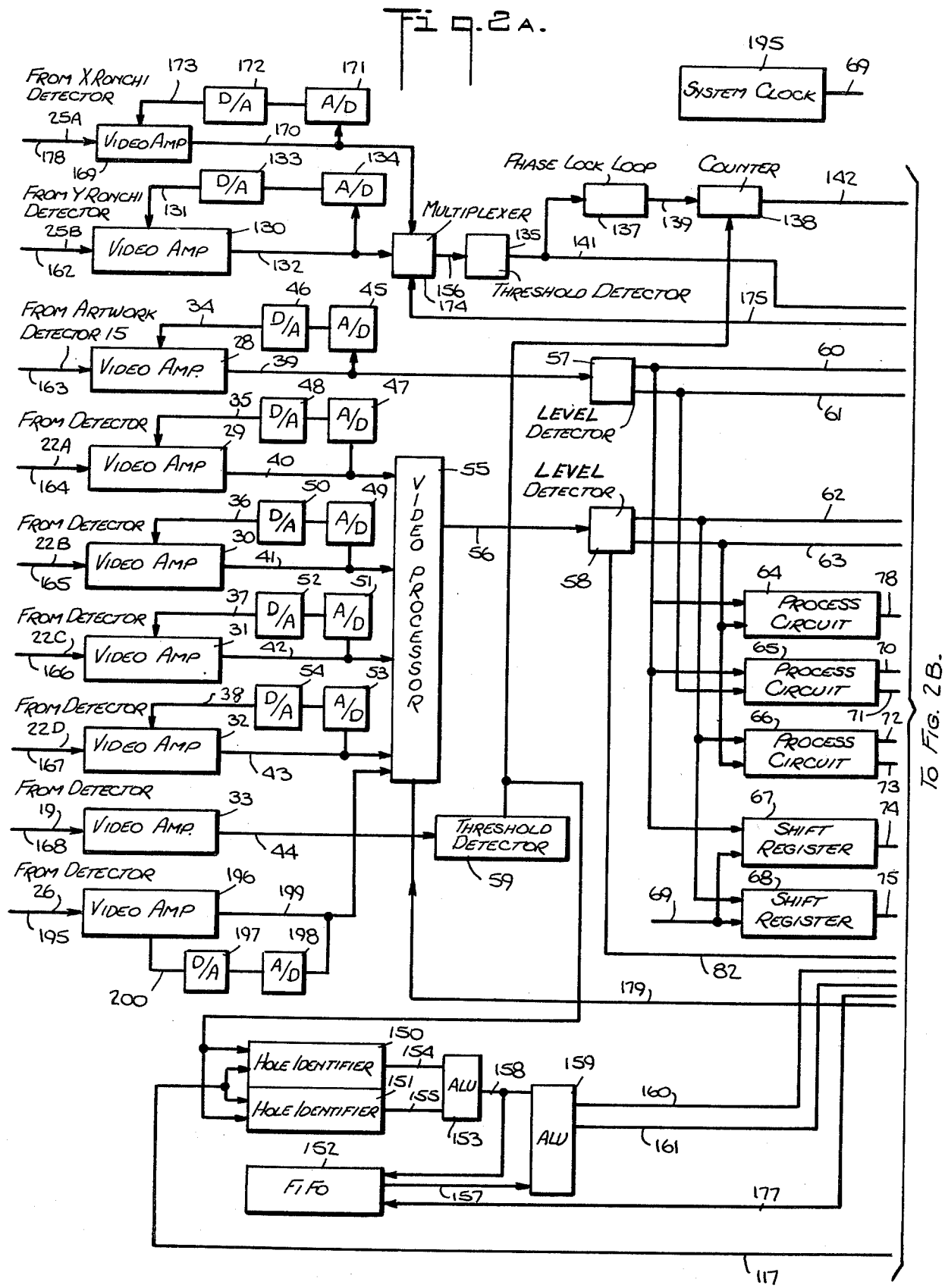
Figure 2B:
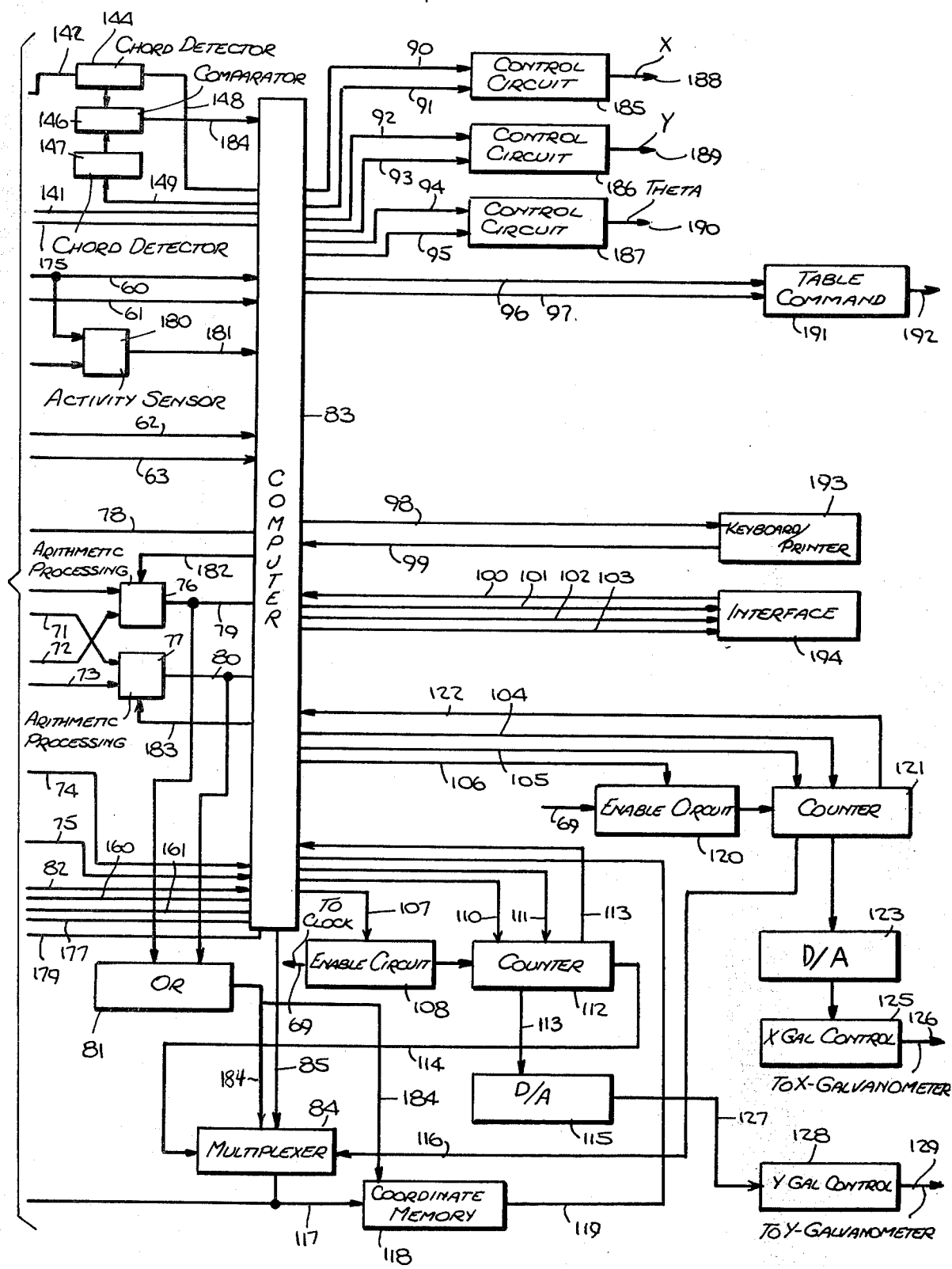

For a better understanding of the invention as well as other objects and further features thereof, reference is made to the following detailed description to be read in conjunction with the accompanying drawings, wherein:

FIG. 1 schematically illustrates a non-contact electro-optical inspection system based on a method in accordance with the invention;

FIG. 2 (A and B) is a block diagram of the electronic data processing measuring system associated with the electro-optical system; and FIG. 3 is a block diagram of an electronic correction arrangement.

DESCRIPTION OF INVENTION

The Basic Approach:

In an inspection technique in accordance with the invention for examining a printed circuit board, the pattern of the printed circuit is compared with the artwork underlying the manufacture of the board. As is well known, before a printed circuit board can be manufactured, one must first develop a transparent pattern of the board. This transparency pattern, generally called the "artwork," is generated in many ways; but regardless of how it is created, it must be in a form which possesses the same scale and the same orientation as the desired conductive pattern on the printed circuit board. Hence the artwork represents the nominal pattern and dimensions required for the conductive pattern on the board or a known relationship thereto.

Various techniques are known through which the artwork is converted to a conductive pattern on the printed circuit board. The concern of the present invention is not with these techniques; for, regardless of which conversion technique is used, the conductive pattern on the printed circuit board may differ from the nominal conductive pattern in a number of respects. The differences between the artwork and the printed circuit pattern fall into three categories: (1) Manufacturing biases may result in the conductive lines on the printed circuit board being either consistently narrower or consistently wider than those of the artwork; (2) Manufacturing tolerances may vary in a positive or negative direction around the nominal value established by the dimension of the artwork and the manufacturing biases; (3) The presence of manufacturing defects. The present invention is directed to the discovery of these differences or defects.

We refer now to FIG. 1, which is a schematic of the electro-optical system in accordance with the invention to examine a printed circuit board conductive pattern, and concurrently, the artwork representing the nominal dimensions to which the board should adhere (modified as required by the manufacturing biases described above).

In this system, a laser beam is deflected by appropriate means to generate a standard type of raster scan consisting of high speed scan deflections in one direction and much lower speed deflections in the other direction. This raster scan is split in a manner making it possible to examine comparable sections of the printed circuit board conductive pattern and the artwork simultaneously. By comparing the dimensions of the conductive pattern and the spacing between conductors on the printed circuit board with the comparable pattern on the artwork, and by taking into proper account the manufacturing biases and the allowable tolerances for the process used, defects in the printed circuit board can be determined and reported on. To simplify the processing of the data generated by this scanning process, each inspected area is scanned twice with the raster rotated 90° between the two inspection scans. During the same scanning process, the position of holes and similar cutouts in the printed circuit board can be established and their dimensions and coordinates compared to the nominal values plus allowable tolerances. This then allows hole and cutout size and position to be established and reported on.

In the optical system illustrated in FIG. 1, a laser beam generated by a laser source 1 is projected through a beam expander consisting of lenses 2 and 3. The beam is then deflected in the X and Y directions by means of suitably positioned mirrors 5 and 6. (In FIG. 1, X and Y directions are defined with reference to the art work 13 and the panel 17. The X direction lies in the plane of the drawing, with positive X to the right. The Y direction is into the drawing, with the positive Y direction away from the viewer.) Mirrors 5 and 6 are driven by galvanometers 4 and 7, respectively, to deflect the beam through an angle which is proportional to the excitation current in the galvanometer coil.

The laser beam is directed by deflecting mirrors 5 and 6 toward a folding mirror 8 whose function is only to reduce the overall size of the scanner package. Mirror 8 then directs the beam through a beam splitter 9 onto a powered focusing mirror 10 having a spherical surface. Mirror 10 reflects the beam back to beam splitter 9 where it reflects off the lower surface toward a beam splitter 11 which divides the beam into two beams. One beam from beam splitter 11 is directed toward a roof mirror 12.

The roof mirror consists of two plane mirrors mounted to form a 90° angle. As shown in FIG. 1, the roof mirror will reflect the scan back through beam splitter 11 to the art work 13. Due to the nature of the roof mirror, after reflection from the roof mirror 12, the X direction of the scan is reversed. There is no change in the Y direction. The need for this reversal results from a similar reversal in the X direction arising from the reflection from the front surface of beam splitter 16 which reflects the scan on the PC board 17 with an X reversal and no reversal in Y. Roof mirror 12 insures that the two scans are oriented in a like manner.

The scanning beam on artwork 13 passes through the transparent portion of the artwork to be collected by lens 14 and focused onto a detector 15. Where the artwork is opaque, the beam, of course, does not pass through, and there is no signal picked up by the detector 15.

The beam that is transmitted through beam splitter 11 from beam splitter 9 goes to beam splitter 16 where the reflected beam goes to the printed circuit board 17 being inspected. The deflected beam going to printed circuit board 17 follows several paths. Where there are holes or cutouts in the board, the beam goes through board 17 to be collected by lens 18 and focused on detector 19. Where there are no holes on the board, the beam is reflected from printed circuit board 17 and is collected in two different ways. The specular or mirror-like reflection is reflected primarily back along the same path as the incident beam, passing through beam splitter 16 to be collected by a lens 20 and focused onto a detector 26. The diffuse or lambertian reflection is collected by a series of four lenses: 21A, B, C and D, and focused onto four detectors: 22A, B, C and D, respectively.

The beam transmitted through beam splitter 16 is used to calibrate the position of the beam on the various scan planes. To achieve this, the beam is split again by beam splitter 196. The reflected beam is used to determine the Y coordinate of the deflection as measured on a reference plane in which the system nonlinearities are the same as those seen in the scanned planes in which the artwork 13 and the printed circuit board 17 are placed.

By use of a ruled grating (or ronchi) 23B, the Y coordinate of the deflected beam position can be established and increments thereof used to determine hole and cutout dimensions and coordinates in the Y direction in the manner described below. The beam transmitted through beam splitter 196 scans X calibration grid (or ronchi) 23A, which is used in a manner similar to the Y calibration ronchi 23B. The light passing through the clear portion of X ronchi 23A is collected by a lens 24A and focused onto a detector 25A.

Because the printed circuit industry has now standardized on printed circuit panels or boards and their associated artwork with patterns up to a size of 24"×24", it is necessary that a practical inspection system be capable of handling both artwork and printed circuit board with patterns up to this size. However, the optics required to cover an area this large without requiring movement of the artwork or the board would become prohibitive in size and cost.

The embodiment described herein makes use of a scan which covers an area of only 12"×12" on the artwork and a similar area on the printed circuit board. Even with a coverage this small, it is necessary that beam splitters 9, 11 and 16 be each 14" by 21". Consequently, with the scan covering an area of 12"×12", it becomes necessary to shift the artwork 13 and the printed circuit board 17 through four positions, in each of which an area of 12"×12" can be examined. For printed circuit boards and their associated artwork which are smaller than 24"×24", fewer movements may then be needed in order to inspect the entire printed circuit board and compare it appropriately with its artwork.

In order to accomplish this motion, artwork 13 and printed circuit board 17 are mounted on a common X-Y table 27. This table provides the four position movements entailed in order to examine an entire 24"×24" printed circuit board and its associated artwork in 12"×12" sections.

Data Processing:

The arrangement for the processing of the data generated by the optical system is illustrated in block diagram form in FIG. 2. The information yielded by the various detectors are fed onto lines 178, 162, 163, 164, 165, 166, 167, 195 and 168. Of these inputs, line 178 supplies the video information from the X ronchi detector 25A, and line 162 the video information from the Y ronchi detector 25B. Line 163 supplies video information from the artwork detector 15. Lines 164 through 167 supply the video information from the four detectors 22A, B, C and D looking at the diffusely reflected light from the PC board. Line 195 provides video information from detector 26 looking at the specular reflection from the PC board while line 168 provides video information from the detector 19 which senses light going through the holes and cutouts of the PC board.

Video amplifiers 169, 130, 28, 29, 30, 31, 32, 33 and 196 are coupled respectively with each of the above input lines. Associated with each of these video amplifiers, with the exception of video amplifier 33, is a pair of A to D and D to A converters, these being used to determine and correct for the offsets in the video system which would otherwise cause voltage displacements in the outputs of each of the video amplifiers. These individual offsets which must be corrected are due to several causes including the dark current from the detector, but more especially the drift in the initial stages of the video amplifiers.

In these correction circuits, the A to D converters 171, 134, 45, 47, 49, 51, 53 and 198 are actuated by computer 83 during the time when inspection of the PC board is not taking place and the laser energy is removed from the system detectors. This removal is effected by driving the galvanometer mirrors 5 and 6 so that they position the beam out of the field of view of these detectors. At this time, A to D converters are commanded to convert the video signal seen at the output of their respective amplifiers to a digital form. Since there is no laser-generated energy falling upon the individual detectors feeding these amplifiers, their output should be zero. The voltage read is the offset voltage due to the causes mentioned above, and must be corrected in order to insure that the outputs of these individual amplifiers can be used as a measure of the energy falling on their associated detectors.

In order to compensate for these offset voltages, the output of the individual A to D converters are fed respectively into their associated D to A converters 172, 133, 46, 48, 50, 52, 54 and 197. The outputs of these D to A converters are then each fed into their respective associated amplifiers through correction lines 173, 131, 34, 35, 36, 37, 38 and 200 to provide an input correction which will compensate precisely for the detected offset voltage.

Amplifier 33, which processes the video information coming from detector 19 which senses the laser energy passing through the holes on the cutouts of the PC board, does not require this correction since the amount of energy falling upon its associated detector is so great that processing of this information can be easily achieved in a sufficiently error-free manner without requiring such correction.

We will now follow the path of the information coming from the energy reflected from the surface of the PC board being inspected. This energy, which is detected by four individual detectors, typified by detector 22 and by specular detector 26, is processed through amplifiers 29, 30, 31, 32 and 196 and is fed through video lines 40, 41, 42, 43 and 199, respectively, into video processing circuitry 55. This processing circuitry, under the control of computer 83 through control cable 179, adds the video information from the four diffuse channels together in a manner well known to the state-of-the-art such that the signal to noise ratio of the resultant video signal which is outputted on line 56 is improved by a factor of 2.

However, in addition to simple addition, processing circuitry 55 performs other functions. It rejects video information generated in the diffuse reflected returns by "glints" which are very bright specular reflections from non-flat surfaces of the metal conductor (or its metal coating) of the printed circuit board. Such specular reflection glints in the diffuse returns produce video signals which are much higher than those produced by diffuse reflections from the surface of the printed circuit board substrate and its conductor pattern. These very high video returns can introduce errors in the subsequent processing of the video data, and are therefore removed.

Video processor 55 also deletes outputs from diffuse video amplifiers 29, 30, 31, 32 which fall below a specified threshold. Due to the viewing angles of the detectors looking at the diffusely reflected energy from the surface of the printed circuit board, each of the detectors will have a poor "visibility" for approximately 20% of the scanned area. While the scan is covering this area, if the output of the detector with the poorest visibility falls below the specified threshold, its output will then be deleted by video processor 55.

Whenever video processor 55 deletes one or more of the inputs provided on lines 40, 41, 42 and 43, it then normalizes the resulting sum so that the output on line 56 does not reduce in value from that which would have been generated had the information from all four input lines been processed together. This threshold decision-making, deletion and normalization process is done by electronic procedures which are well known to the state-of-the-art.

Under the control of computer 83, video processor 55 is also used to choose the video signal developed by specular reflection and detected by detector 26 where the combination of board substrate and conductor finish provide a better signal-to-noise ratio in the specular reflection than in the diffuse reflections.

The output of the video processor 55 is fed through data line 56 to level detector 58. Here it is converted into a set of quantized video signals carried on output lines 62 and 63; line 62 containing a logic ONE to indicate the sensing of a conductor by the scanning of the printed circuit board 17, line 63 containing a logic ONE to indicate a sensing of a space between conductors by the scanning of the printed circuit board 17. When neither line 62 nor line 63 carry a logic ONE, this signifies that the scan is traveling parallel with the edge of a conductor and generating data which cannot be used to determine precise conductor edge position as part of the inspection processing.

The information on lines 62 and 63, in addition to being fed directly to the computer, is also fed to processing circuitry 66, 68 and 64. Processing circuitry 64 is an activity sensor to determine that information is being generated by the scanning of the printed circuit board, and reports any absence of information during the scanning process to the computer 83 on data line 78. Processing circuitry 66 determines the width of the lines and spaces whose edges are detected by level detector 58.

Processing circuitry 68 is a shift register with a series of time slots which are "loaded" or filled whenever a conductor is sensed by the scanning of the printed circuit card; such sensing being indicated by the presence of a logic ONE on line 62. The result of so loading of shift register 68 is to provide at the end of each scan a memorized history of all of the conductor information which was found in the just completed scan. The application of this information will be covered in the discussion to follow.

The output of amplifier 28 on line 39 contains the video information generated by scanning the artwork 13. This information is fed into level detector 57, whose output is a pair of lines similar to the output of level detector 58 discussed above. Line 60 contains a logic ONE whenever the scanning of the artwork 13 results in information which represents the sensing of a conductor pattern by the scanner. Line 61 contains a logic ONE whenever the scanning of the artwork 13 generates information indicating the sensing of a space between conductor patterns on artwork 13. The outputs of lines 60 and 61, in addition to being fed directly to computer 83, are also fed into activity sensor 180 which reports absence of activity on the output of level detector 57 to computer 83 on data line 181.

The result of so combining the outputs of processing circuitry 65 and 66 is that arithmetic processing unit 76 is given the widths of corresponding conductors found by scanning corresponding sections of the printed circuit board and its artwork. Similarly, arithmetic processing unit 77 is given information on corresponding conductor spacings on corresponding areas of the printed circuit board and the artwork. These arithmetic logic units (ALU's) using techniques known to the art, compare the dimensional information fed into each. This information represents corresponding conductor widths and conductor spacings. Then using tolerance and bias information provided by the computer through line 182 and 183, ALU's 76 and 77 report to the computer on lines 79 and 80 any dimensional differences between the artwork pattern and the printed circuit board pattern which exceeds the allowed tolerances plus bias provided on lines 182 and 183. Information on line 79 and 80, indicating out of tolerance conditions, is also fed into OR circuitry 81 from which is generated an ENABLE command on line 184 to multiplexer 84 which, in turn, under appropriate command from the computer 83 carried on line 85, chooses the coordinate of the high speed scan which is fed either on line 114 or line 116 and supplies this as an output on line 117.

This coordinate indicates the position on the scan line at which the out-of-tolerance condition was found. This information is provided as part of the reject output report generated on keyboard/printer 193.

It is to be noted that the need for multiplexer 84 is imposed by the requirement to inspect by using two rasters in sequence. One raster has its high speed scan in the X direction, the other has its high speed scan in the Y direction. Thus, to find the high speed coordinate which gives distance along the high speed scan line, which coordinate indicates the position of the detected defect, multiplexer 84 is provided to allow reading the count in whichever counter (112 or 121) that controls the high speed scan.

The remainder of the input circuitry to computer 83 is devoted primarily to determining the center coordinates and the diameter of the holes in the printed circuit board. In order to determine these, the hole must first be sensed. This is accomplished by detector 19, amplifier 33, and threshold detector 59. Next the coordinates associated with the hole must be determined. This is accomplished by use of calibration rulings 23A and B, their associated optics 24A and B, and amplifiers 169 and 130 in association with multiplexer 174, threshold detector 135, phase lock loop 137 and counter 138.

When scanning a printed circuit board by a raster scan, a hole is first detected by traversing a relatively small chord of that hole. As the raster moves across the board, the chord intercepted goes through a maximum size and then decreases until the hole is no longer intercepted. Since several such holes will appear along any one scan line, it is necessary to identify each of the holes being scanned, and the intercepted chord length for each in order to determine their diameter and center coordinates by the method given below. To accomplish this, each hole is identified by the coordinates of the center of its intercepted chord. The circuitry for accomplishing this is embodied in blocks 150, 151 and 153. Block 152 maintains a history of the identifying numbers (i.e.: the coordinates of the center of the intercepted chords) of all holes detected on the preceding scan line. These are compared by ALU 159 with the identifying number just found, to determine whether they identify the same hole or not.

In order to determine the precise coordinates at which the scanner is operating, with proper compensation for the non-linearities of the galvo-driver and the associated optics, it is necessary to use some method of calibrating and linearizing the scan. This is accomplished by use of the X and Y calibration rulings 23A and 23B along with their collection optics 24A and 24B, and the detectors 25A and 25B. The output of these detectors are fed through lines 178 and 162 to video amplifiers 169 and 130, where they are appropriately compensated for ZERO offset, as explained above, by compensation circuitry 171, 172, 134 and 133.

The outputs of amplifiers 169 and 130, provided on video lines 170 and 132, respectively, are fed into multiplexer 174 which is under the control of computer 83 by means of control line 175. The output line 156 of multiplexer 174 then either carries video information from the X ronchi, when the high speed scan is in the X direction or the output is from the Y ronchi when the high speed scan is in the Y direction. Output line 156 feeds into threshold detector 135 where it is converted to a standard logic signal which can be used to drive phase lock loop 137. The output of phase lock loop 137 is provided on line 139 as a nominal 12 MHz signal, which by use of standard techniques is locked in frequency to the rate at which the laser scan traverses the appropriate ronchi in the high speed direction and varies with this rate. This signal, then, is a clock frequency which is corrected for the non-linearities of the scanned system and the optics so that its output can be used, as described below, to measure the diameter of the holes detected by the scanning operation.

The above described arrangement operates in the following fashion. The output of threshold detector 59 is a logic ONE whenever the scanning beam passes through a hole or a cutout in the PC board. The following description is limited to the processing of round holes, since they are the most common form of hole used in the manufacturing of printed circuit boards. Holes of other shapes can have their coordinates determined by appropriate modification of the techniques described below.

The transition of the output of threshold detector 59 from logic ZERO to a logic ONE indicates the initiation of the detection of a hole. This causes the starting coordinates along the scan line of the hole to be transferred from the appropriate high-speed scanning counter 112 and 121 through multiplexer 84, data line 117, to latch hole identifier 150, which stores this starting coordinate. Similarly, the transition of the output of threshold detector 59 from a logic ONE to a ZERO indicates the end of the sensed chord of the detected hole. This initiates a transfer of the coordinate along the scan line of the end of this chord through multiplexer 84, data line 117 to latch hole identifier 151. The starting and ending coordinates of the chord are fed through data lines 154 and 155 to arithmetic logic unit (ALU) 153, which determines the coordinate along the scan line of the center of this chord, and provides it as an output number on line 158 to ALU 159.

Associated with ALU 159 is an editable FIFO (a memory so configured that information is handled on a first-in, first-out basis). FIFO 152, controlled by computer 83, stores the center coordinates of the chords detected on the previous scan. For the first scan of each raster, the computer 83 has sufficient "intelligence" to insure that the centers of all of the detected chords are stored without requiring any special processing. On all scans after the first, an output is generated on line 157 from FIFO 152 which is compared by ALU 159 to the output on line 158 from ALU 153. By appropriate subtracting algorithms, ALU 159 can determine two properties from the comparison of the information on line 157 and line 158, these being (1) which of the two is larger, and (2) by how much.

If the difference between the two inputs is less than some predetermined number n, then the decision is made that the two chord center coordinates on lines 157 and 158 represent the same hole. This information is provided on output line 160 from CPU 159 as a logic ONE to the computer. If the difference between the two coordinates is greater than the predetermined number n, then it is determined that these two chord center coordinates do not represent the same hole, and this is reported as a logic ZERO on line 160, whereupon the information on line 161 is used by the computer. Line 161 provides the information as to which of the two chord center coordinate numbers is larger. From this, the computer can determine whether the fact that the two coordinates do not represent the same hole results from a new hole being detected, or the previous hole passing out of the field of view of the raster. From this information, the computer then commands an EDIT operation on line 177, which results in either the insertion of a new coordinate into the FIFO 152 at the appropriate point in the string of information, which information is provided to FIFO 152 on line 158 from ALU 153; or the EDIT command calls for a deletion of the coordinate which represents a hole that has passed out of the field of view of the raster.

As each hole is detected and a chord is scanned across it, chord detectors 144 and 147 and comparator 146 determine when the scan line is passing across the largest chord detectable for that hole. This is accomplished in the following manner. Under the control of threshold detector 59, counter 138 counts the clock input provided on line 139 during the time the scan senses the presence of a hole.

The count generated by counter 138 during the time threshold detector 59 generates a logic ONE output indicating the sensing of a hole by the scanner represents the length of the chord traversed by the scan across the hole. This number generated by counter 138 is then transferred to latch chord detector 144. At the same time, the computer transfers to latch chord detector 147 a number representing the chord length measured on the previous scan for the same hole. The numbers stored in latch 144 and latch 147 are compared by comparison circuit 146 whose output is fed to the computer 83 on line 184. Since by definition, the diameter of a circle is the largest chord which can be drawn across the circle, the method of determining the proper value for the diameter of each circle is simply the first value stored in latch 147 for which the value in latch 144 is smaller.

When the diameter of the hole is found, the coordinates of the center of the hole are then the center coordinates available on line 158, and the coordinate of the low speed scan for which the first value in latch 147 greater than the value in latch 144 is found.

The remainder of the circuitry shown in FIG. 2 is output circuitry from the computer to control various functions of the scanner, the X-Y table and other peripherals. The scan generated on artwork 13 and PC board 17, as shown in FIG. 1, covers an area on each $1' \times 1'$. In order to be able to inspect a larger area of the PC board, it is necessary to move both the board and the artwork such that the $1' \times 1'$ scan can be used to examine an area of the board and the artwork larger than the $1' \times 1'$ scan.

An X-Y table 27 is provided to accomplish this movement. In the embodiment described herein, the inspection cycle consists of moving the table to only four positions. This allowed the $1' \times 1'$ scan to completely examine a pattern which is $2' \times 2'$, or smaller. This requires that the table be required to move only to its extreme plus X, its extreme minus X, its extreme plus y or its extreme minus Y position with no intermediate positions required. This can be accomplished by very simple drive mechanisms operating against mechanical stops and requires only two control lines, one for X and one for Y, in which control lines a logic ONE represents a command to move to the extreme negative position. This circuitry is shown in FIG. 2, consisting of command lines 96 and 97 going to the table command circuitry 191.

Mounted on the X-Y table 27 is a small positioning table 27A, which is used to provide initial alignment of the PC pattern to the artwork pattern, to insure that comparable parts of the two patterns are being scanned during the inspection process. The command lines and control circuitry for the X, Y and Theta a fine positioners for Table 27A are provided by lines 90, 91, 92, 93, 94, 95 and control circuits 185, 186 and 187, respectively, using commercially available techniques and controllers.

A keyboard/printer 193 is provided for computer 83. This is a standard commercially available computer peripheral, providing operator-initiated command signals to the computer, and responding to them with suitable computer controlled printouts, as required. In addition, the printer also provides the inspection reports for the printed circuit board being inspected, printing out the coordinates at which out of tolerance conditions have been found, and the nature of each of the out of tolerance conditions, normally by means of a suitable code. Communication between the computer 83 and the keyboard/printer 193 is by means of output and input lines 98 and 99.

Also provided is a control and communication system in which a pushbutton is provided to initiate the inspection and two lights are provided; one is lit at the end of the inspection cycle, the other is lit to indicate that the inspection has been aborted by the computer. In addition, a signal is also generated to the computer to indicate that the access door for loading and unloading the PC board to be inspected has been closed. This is a safety feature to insure that the operator will not be looking at any part of the interior of the system while the laser is on. The communication lines for this interface 194 are provided by lines 100, 101, 102 and 103.

The remaining output circuitry is associated with developing the scan, and generating and reporting information concerning scan coordinates. Since the system requires that the PC board and associated artwork be examined by two separate sequentially generated rasters, one of which has its high speed scan lying in the X direction, with the low speed scan in the Y direction, and the second raster having its high speed scan in the Y direction with its low speed scan going in the X direction, the scanning circuitry and the associated galvanometers driving the scanning mirrors must each be capable of performing low or high speed scans under computer control. When the high speed scan is in the X direction, a system clock on line 69 is enabled by ENABLE circuit 120 to drive counter 121 whose output is converted by digital-to-analog converter 123 to an analog signal which drives the X galvanometer control circuit 125. The output of control circuit 125 is supplied on line 126 to directly drive the X galvanometer. When counter 121 reaches the end of its count, it provides an "overflow" signal on line 122 to computer 83 to provide an indication that the count is complete, meaning that a single X scan line is finished. The computer then commands the Y control counter 112 through control line 111 to advance by one count. The output of counter 112 is converted to a new analog value by D to A converter 115, and its output on line 127 then commands the Y galvanometer to move its mirror the appropriate amount through control circuit 128 and control line 129.

When the raster is rotated 90°, Y provides the high speed scan, and X provides the low speed scan, then the clock on line 69 is enabled by circuit 108 as controlled by control line 107 from the computer, and advances Y counter 112 to provide the necessary high speed scan through D to A converter 115 and Y galvo-driver circuit 128. In this configuration, the overflow of Y counter 112 is fed to computer 83 through line 113 and the computer then advances X counter 121 by one on a command provided on line 104 for each completed Y count reported by line 113. Both the X counter 121 and the Y counter 112 have reset lines 105 and 110, respectively, controlled by computer 83 to initiate the scans.

Multiplexer 84, controlled by computer 83, is set to accept either line 114 from Y counter 112 or line 116 from X counter 121 to provide a coordinate output on data bus 117. This output, in addition to being used as described above to determine coordinates of holes to latches 150 and 151, is also provided as an input for coordinate memory 118. This memory, under control of line 184 from OR gate 81, will accept and store the input from multiplexer 84 whenever the output of OR gate 81 indicates that an out of tolerance condition has been sensed by ALU 76 or ALU 77, reported on lines 79 or 80.

These coordinates are stored for a single scan line and allow the information on the individual out of tolerance conditions to be reconstructed from shift register 67, shift register 68 and coordinate memory shift register 118. Thus, at the end of each scan line on which one or more out of tolerance conditions are found, the scanning operation is stopped and the appropriate information is extracted from shift registers 67, 68 and 118 and, after proper processing by computer 83 to insure that no redundant information has been reported, is printed out on keyboard/printer 118.

Advantages and Features:

The main advantage of the invention resides in the fact that the examination of the printed circuit pattern is made by comparing it with the artwork which must be generated in order to manufacture a printed circuit board. By using the artwork itself, the necessity for providing a separate program for each separate printed circuit pattern is eliminated.

On the other hand, the invention does not dictate that the pattern on the printed circuit board be identical to that on the artwork. This would be completely impractical; and not only would make no allowances for manufacturing tolerances, but even more important allow no manufacturing biases. Many of the processes by which a printed circuit pattern on a printed circuit board is produced from an artwork master result in known biases which can make the conductor path on the final board either appreciably wider or appreciably narrower than the portion of the artwork used to generate this pattern.

Thus in using the artwork as a basis for determining whether the pattern on the printed circuit board is acceptable or not, the artwork is used to provide the nominal dimensions only of the pattern required on the printed circuit board. Computational techniques must be used to compare the dimensions of the printed circuit pattern with those of the artwork pattern and determine whether the printed circuit pattern is within the allowable tolerance of the nominal value defined by the artwork pattern, taking into account manufacturing biases for the particular board.

In addition to the above factors, there are distortions between the pattern seen on the artwork and that seen on the printed circuit panel due to changes in dimension of the artwork material itself, especially if it is not formed on a glass base. Similar size changes can arise on the printed circuit panel due primarily to variations in absorbed moisture. In many cases, the inspection of the PC board must be independent of these changes. The inspection system must compensate for these factors. This can easily be done in the direction of the slow scan by using the "piggyback" X, Y, $\theta$ table to provide differential motion between the artwork and panel to compensate for the dimensional changes of the artwork or the panel.

To compensate for dimensional changes in the direction of the fast scan, the correction technique must provide the continuous incremental positional correction during the time of a fast scan, which, in the embodiment described herein is of the order of 0.002 seconds. To accomplish this, an all-electronic correction is required. FIG. 3 schematically shows a preferred form of a suitable correction means.

In FIG. 3, the quantized video signal generated by scanning the PC panel is fed into two tapped delay lines 197 and 198 connected in series. The video signal from the artwork is fed into a fixed, non-tapped delay line 202. The delay of each of these lines 197, 198 and 202 is chosen to correspond to the largest dimensional change expected in the panel and artwork combined, which is 1%. Since the high speed scan makes a traverse in 2 milliseconds, the delay lines would each be 1% of 2 milliseconds or 20 microseconds. For a 12" scan as described in the embodiment herein, this corresponds to 0.12" (that is, 1% of 12"). The panel video at tap 200 will have exactly the same time delay as the artwork video on line 203. Any dimensional changes in either can be compensated by choosing the panel video from one of taps 199 or 201; the "early" taps 199 providing the opposite sense of dimensional correction from those of the "late" taps 201.

In the embodiment described herein, compensation to provide video agreement corresponding to physical agreement of 0.005" greatly simplifies data processing. This requires 24 taps for delay lines 197 and 198, a requirement which can be met easily using commercially available digitally clocked shift registers.

In the present technique, it is necessary to scan each area of the printed circuit board and the associated artwork twice; once with a raster having its high speed scan in the X direction, and once with the raster having its high speed in the Y direction. This insures that all conductors in the pattern are intersected by a scan at an angle between 45° and 90°. When this is done, the comparison of conductor widths and spacings between the conductors can be on a scan line-by-scan line basis. If only one scan raster were used, several scan lines would separate the edges of conductors parallel to the scan. Making comparisons of these conductor dimensions would require very careful computer bookkeeping and control to measure the conductor widths and spacings to provide proper comparison between artwork and PC board to separate acceptable patterns from rejects.

In order to determine whether the holes in the PC panel are in the proper position, two criteria are used. The first compares the position of the holes with the surrounding conductive pattern and determines that there is sufficient conductor surrounding each of the holes to insure that the manufacturer's or user's specification is being met. The second requirement for the holes is based on the actual machining dimensions of the holes insofar as their diameters and the X-Y coordinates of their centers are concerned.

In all large volume production of printed circuit boards today, the position and diameter of the individual holes is or can easily be made available in a computer compatible numerical form. In general, the holes are generated in the production of the PC boards by use of numerically controlled (NC) drilling machines. Thus the X-Y coordinates of the holes and their diameters can be extracted from the digital tape which is used to control the NC drilling machines. Proper manipulation of the data on these digital tapes using state-of-the-art techniques will put it in the format needed for the described inspection system.

A major feature of the invention resides in the fact that the board as well as the artwork are scanned perpendicularly to their surface. This is the main reason for the use of the powered mirror 10 which acts not only to focus out the beam on the surface of the artwork and the PC board, but does it in a manner which in optics is called "telecentrically," which means in this case that the beam as it is scanning is everywhere moved parallel to itself, and consequently is everywhere perpendicular to the surface of the objects being scanned.

This has two major advantages. The first is that it provides the opportunity to control the return from the board when viewed specularly or diffusely. If the scan is not everywhere perpendicular to the board, then detector 26 would not see a specular return from all of the 12"×12" scanned area.

The second advantage of the telecentric scan is that it permits measuring the hole diameters and the hole coordinates accurately over the entire 12"×12" area scanned independent of board thickness. If the scan pivoted around some point off the board, the scan beam would then strike the board at varying angles as it moved across the board. The apparent hole diameter (and the center of the hole computed from that diameter) would be a function of the angle at which the scan met the board, and would result in an error in both hole diameter and center coordinate, which error would vary with the angle of the scan and the thickness of the board. In fact, as the board thickness increased, a point would be reached where the scan would no longer find any intercepted area through which the hole would be detected.

The embodiment described herein makes use of a scanning laser beam to view both the artwork and PC panel. The information derived from the artwork is based on variations in transmission, while information derived from the panel is based on variations in reflectivity, with holes and cut-outs sensed by variations in transmission.

One modification of this embodiment, which is also part of this invention, determines the positional spacing of conductors on the PC panel by making use of the difference in fluorescence in the conductor material and the insulating substrate material (instead of sensing the difference between the two by their differences in reflectivity). To establish fluorescence, a short-wave laser is used. Commercially available for this application today are helium-cadmium lasers and argon lasers, among others. All of the information shown in FIGS. 1, 2 and 3 still define this embodiment variation using differences in fluorescence instead of differences in reflectivity by simply adding commercially available optical filters in front of detectors 26 and 21 A, B, C, and D.

These filters are used to attenuate the energy generated directly by the lasers by a factor of more than a million while transmitting the majority of the energy generated by the fluorescing panel material with attenuation of less than 50%. Since the commonly used substrates provide a high fluorescent output and none of the conductive materials used provide any detectable fluorescent output, differentiation between the substrate and the conductive material is simply a function of detecting the presence or absence of fluorescence by the technique described above.

Also, in its configuration for sensing reflection differences, the inspection system can be used for in-process inspection of PC panels during the manufacturing process. In order to understand the differences between in-process and final inspection of this type, it is necessary to understand some of the manufacturing techniques for fabricating PC boards. Most PC boards are made by an etching process where the raw material is a sandwich consisting of sheets of insulating or substrate material covered on one or both sides with copper foil. The conductive pattern desired is generated by using an etching process to remove the copper which is not wanted. The first major step in this operation is to transfer the desired pattern from the art work to the copper surface. This can be done by several processes. One is the use of silk screening techniques. After silk screening, the pattern can be inspected before additional work is done on the board. Similarly, another technique makes use of generating the desired pattern on the copper by means of a plating technique. Here, also, the difference in reflection between the plated metal and the unplated copper is great enough for a system sensitive to reflection differences to provide automatic inspection.

In neither of these in-process techniques can the fluorescing inspection method be used, since in both cases the substrate material is not yet exposed. However, the inspection system with the short-wave laser (helium-cadmium or argon) can be used without the attenuating optical filters placed before the detectors.

While there has been shown and described a preferred embodiment of an electro-optical system for inspecting printed circuit boards in accordance with the invention, it will be appreciated that many changes and modifications may be made therein without, however, departing from the essential spirit thereof.

I claim:

1. A system for inspecting a printed circuit board constituted by an insulating board having a conductive pattern thereon which creates interconnections between circuit elements mounted on the board, the board often having holes therein for effecting electrical connections to these elements, said conductive board pattern being derived from an original transparent artwork, said system comprising:
   A. means to deflect a laser beam in the X and Y directions to generate a raster scan;
   B. means to optically split the raster scan to simultaneously examine corresponding sections on the conductive pattern on the board and that appearing on the original transparent artwork from which the board pattern is derived, the artwork possessing the same scale and orientation as the desired conductive pattern and therefore representing the nominal pattern required for the board;
   C. means to detect the light transmitted through the artwork and the light reflected by the board during the simultaneous scan thereof; and
   D. means including a computer responsive to signals generated by said detection means to make a comparison between the dimensions of the conductors in the pattern and the spacings therebetween on the board and on the artwork to determine the extent of disparities therebetween.

2. A system as set forth in claim 1, further including means to detect the light transmitted through any holes in said board during the scan thereof and to apply the resultant signal to said computer to compare the position of the holes and their dimensions and coordinates with nominal values therefor stored in the computer to determine their degree of deviation from these nominal values.

3. A system as set forth in claim 1, wherein said artwork and said board are supported on an X-Y table adapted to shift the artwork and the board with respect to their respective raster scans to select the corresponding sections to be examined.

4. A system as set forth in claim 3, wherein said artwork is supported on a sub-table to shift the position of the artwork relative to said board in said X-Y table.

5. A system as set forth in claim 1, wherein said means to optically split the laser beam raster scan includes a first beam splitter which directs one division of the scanning beam toward a roof mirror which reflects the beam toward and through the artwork to be intercepted in a first detector to sense the light transmitted through the artwork.

6. A system as set forth in claim 5, further including a second beam splitter which receives the other division of the scanning beam from the first beam splitter and directs it toward the board, the light reflected by the board passing through the second beam splitter and being intercepted by a second detector.

7. A system as set forth in claim 6, wherein the light passing through the holes in said board are picked up by a third detector.

* * * * *